Jan. 5, 1943.  G. D. JOHNSON  2,307,275
DRILLING SAFETY JOINT
Filed Jan. 24, 1941
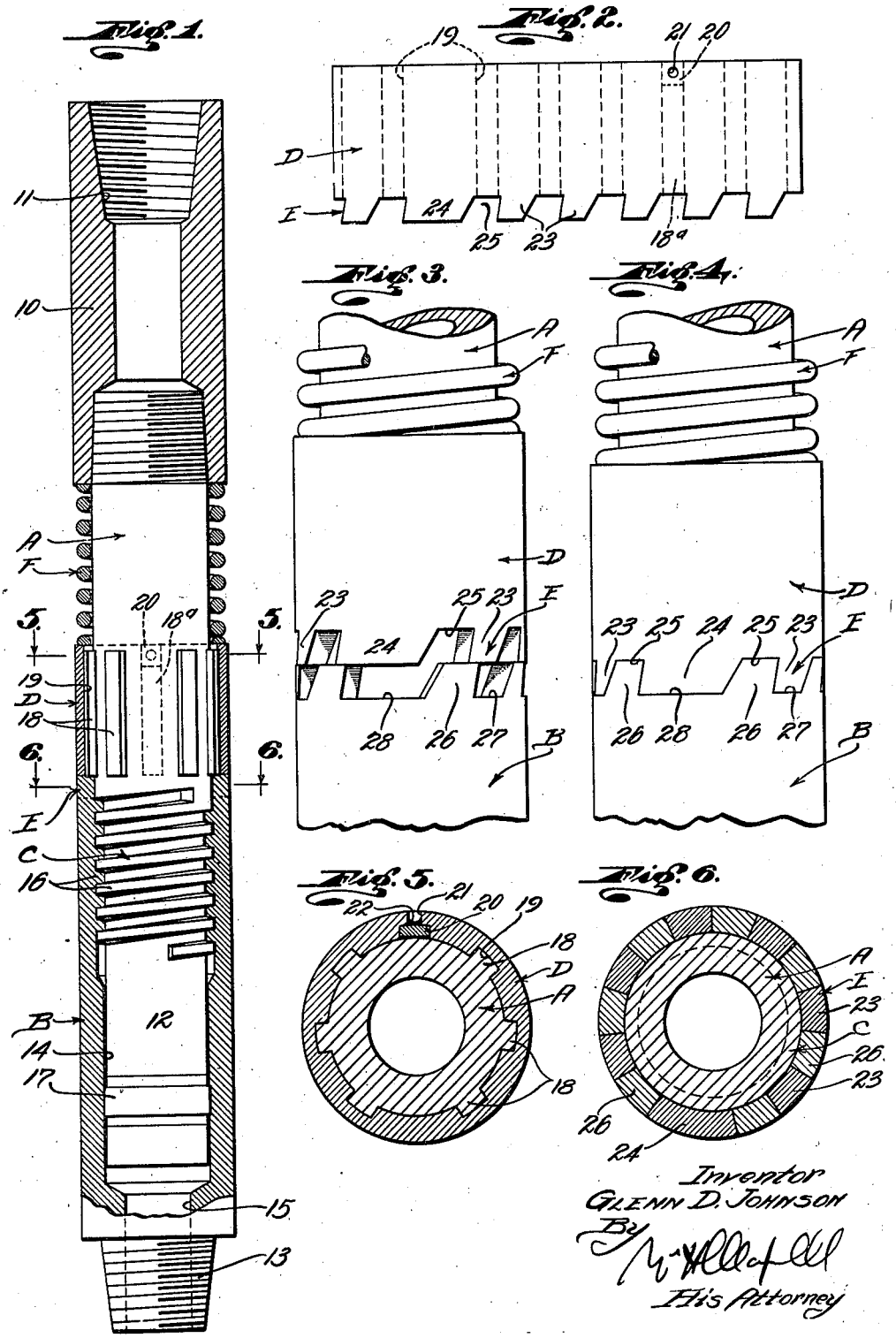
Inventor
GLENN D. JOHNSON
By
His Attorney Patented Jan. 5, 1943

2,307,275

UNITED STATES PATENT OFFICE 2,307,275

DRILLING SAFETY JOINT

Glenn D. Johnson, Compton, Calif., assignor to Baash-Ross Tool Company, Los Angeles, Calif., a corporation of California Application January 24, 1941, Serial No. 375,747

5 Claims. (Cl. 285—146)

This invention relates to well tools and relates more particularly to safety joints for use in drilling strings and other well strings. A general object of this invention is to provide a strong, dependable and long wearing safety joint.

It is a common practice to provide safety joints in well drilling strings, fishing strings, etc. to allow the disconnection and recovery of the major portions of such strings in the event the bits or well tools become caught in the wells. A safety joint is usually designed to transmit compression, tension and right hand torque without loosening or becoming disconnected and are constructed for disconnection by special manipulation of the well string, for example, by left hand rotation of the string.

The safety joints in general use are quite satisfactory for employment in fishing strings, etc., where they are not subjected to hard usage but wear quickly when connected in a drilling string. The action of the drilling tool or bit produces intermittent and substantial variations in the torque load on the drilling string and these variations cause the small torque transmitting parts of the safety joint to be hammered together so that they are quickly worn. In this connection I will refer to United States Letters Patent 2,049,289 and 2,065,932 as representative of that class of safety joint which has inadequate and quick wearing torque transmitting parts. Such safety joints have a threaded connection between the releasable joint sections, a yieldingly held drive member non-rotatable on one of the sections, and cooperating shouldered parts on this member and the other section for the transmission of the torque. The extent of the shouldered engagement is determined by the lead of the threads connecting the joint sections, there usually being two sets of engaging shoulders, each having a height less than one-half the lead of the threads. These small shoulders are inadequate for the transmission of the drilling torque and are rapidly battered and distorted by the hammering action caused by variation in the drilling torque.

Another and important object of this invention is to provide a safety joint of the general class above referred to which is characterized by a large aggregate shouldered engagement between the shiftable drive member and opposing joint section for effectively and dependably transmitting the varying drilling torque for extended periods without wear. The torque transmitting surfaces of the safety joint provided by this invention are many times larger in aggregate area than the corresponding parts of prior joints of this type and are fully adequate for the transmission of the heavy varying drilling torque.

Another object of this invention is to provide a safety joint of the character referred to that is positive in its transmission of longitudinal forces in both directions and torque in one direction and that is strong so that it cannot fail in operation.

Another object of this invention is to provide a safety joint of the character referred to that will not stick or bind even under the most severe operating conditions. The heavy threads connecting the joint sections of the tool cannot be tightened or made to stick or bind under any condition and the joint is easily released when desired.

Another object of this invention is to provide a safety joint of the character mentioned embodying novel torque transmitting parts which provide for the equal distribution of the loads throughout the circumference of the co-acting splined member and joint section.

Another object of this invention is to provide a safety joint of the character referred to that is easily and quickly assembled at the ground surface and readily released by appropriate simple manipulations of the well string when in the well.

A further object of this invention is to provide a safety joint of the character referred to which is simple and inexpensive to manufacture and which is readily reconditioned when worn.

The various objects and features of my invention will be readily understood from the following detailed description of a typical preferred form and application of the invention, throughout which description reference is made to the accompanying drawing, in which:

Fig. 1 is a central longitudinal detailed sectional view of the safety joint provided by this invention in the assembled or made up condition showing one section in side elevation. Fig. 2 is an elevation view of the splined drive member showing the developed circumference of the member and illustrating its torque transmitting parts. Fig. 3 is an enlarged fragmentary side elevation of the intermediate portion of the tool illustrating the manner in which the torque engaging parts ride one upon the other prior to their final meshing engagement. Fig. 4 is a view similar to Fig. 3 showing the torque transmitting parts fully engaged and Figs. 5 and 6 are enlarged transverse detailed sectional views taken as indicated by lines 5—5 and 6—6, respectively, on Fig. 1.

The improved safety joint of the present invention may be said to comprise, generally, two main joint sections A and B having a releasable threaded connection C, a driving member D shiftably but non-rotatably engaged on the section A, means E on the member D and the section B for the transmission of torque, and yielding means F for urging the member D to the position where the means E is engaged.

The sections A and B, when held in the connected relation by the connection C, constitute an assembly interposed in a rotary well drilling string, fishing string, or other well string. The section A, which I will term the upper section, is the mandrel section while the section B is the socket section. The section A is an elongate tubular member provided at its upper end with means for connection with an adjacent part of the well string. In the case illustrated a connecting member 10 is threaded on the upper end of the section A and has a box or socket 11 in its upper end for receiving a pin or an adjacent part of the well string, not shown. The upper joint section A is preferably cylindrical and may be of uniform external diameter except for a reduced lower portion or stem 12.

The section B is an elongate socket member adapted to receive a substantial portion of the section A. The lower joint section B is provided at its lower end with means for connecting with an adjacent part of a drilling string or other well string. In the case illustrated a reduced tapered screw threaded pin 13 is formed on the lower end of the section B to be threaded in a tool joint section, or the like, of the string. The major portion of the lower joint section B has a longitudinally extending socket 14 of substantial diameter. The socket 14 enters the section B from its upper end and is preferably cylindrical. The passage or fluid opening 15 of the section B is reduced in diameter where it continues through the connection pin 13.

The releasable threaded connection C between the sections A and B is provided to normally connect the sections in their coupled relation and is such that it may be readily disconnected or unthreaded to permit the withdrawal and recovery of the well string or that portion of the well string above the section A. The connection C comprises cooperating threads 16 on the section A and the wall of the socket 14. The threads 16 are preferably quite heavy and are formed with a substantial lead. Further, the threads 16 are of substantial length to dependably transmit heavy axial loads and to require a number of revolutions of the section A relative to the section B to complete the disconnection of the joint following the release of the means E. In the particular case illustrated the threads 16 are right hand threads so that they are made up by right hand rotation of the upper section A relative to the section B and so that the joint may be disconnected by left hand rotation of the section A relative to the section B following the release of the means E. The threads 16 are free working and are formed so that they cannot jam, bottom or become tight.

It is usually preferred to provide means for sealing between the main joint sections A and B. In the drawing I have shown a suitable packing means or packing gland 17 on the stem 12 for sealing with the wall of the socket 14. The packing gland 17 serves to prevent the leakage of the circulation fluid which is pumped down through the string under pressure during drilling operations, etc.

The member D is shiftably and non-rotatably engaged on the section A to be above the section B when the joint is assembled or made up. The member D is a rather thick walled collar or sleeve surrounding the section A. In practice the member D may be of the same external diameter as the section B and slidably rides on the periphery of the section A.

Key or spline means is provided to hold the sleeve member D against turning on the section A. A plurality of spaced longitudinal splines 18 is provided on the section A and the splines are slidably received in correspondingly shaped keyways or grooves 19 formed in the interior of the member D. The splines 18 are formed and located to be entirely within the member D when the latter is in its operative position and are preferably of almost the same length as the member D.

Means may be incorporated in or associated with the spline means for limiting the downward movement of the member D relative to the section A. One of the splines 18 may be utilized as a stop on the section A. This spline 18ª is shorter than the other splines, having its upper end spaced below the plane occupied by the other splines. A stop lug or block 20 is secured in the groove 19 of this short spline 18ª to engage its upper end. The block 20 is fixed in the upper portion of the groove 19 to cooperate with the upper end of the shortened spline 18ª when the member D is in its lowermost position. The stop block 20 may be welded in place. As best illustrated in Fig. 5 of the drawing, a radial opening 21 is formed in the wall of the member D and welding 22 in the opening fixes the block 20 to the member D.

The means E is an important element of the invention. The means E operates to limit turning of the section A relative to the section B in one direction, in the case illustrated the right hand direction, and serves to transmit rotation or torque between the sections in the same direction and thus prevent tightening of the threads so that the safety joint may be easily disconnected by reverse rotation of the section A when the equipment is in the well. The torque transmitting means E of the present invention is characterized by its large aggregate or total area of contact of the member D with the section B which assures the dependable transmission of heavy torque and makes the tool long wearing even under the severe operating conditions characterizing rotary well drilling operations.

The means E comprises a plurality of teeth or lug parts on the lower end of the member D and a complementary or cooperating set of lug parts on the upper end of the section B. There is a number of like or identical lug parts 23 and a special or wider lug 24 on the lower end of the member D. The parts 23 are in the form of clutch lugs or teeth and are of equal size and of uniform spacing to leave spaces or notches 25 of substantially the same width. It is a feature of the invention that there may be a substantial number of parts 23 of suitable width and of substantial height. The height or longitudinal extent of the lugs 23 is equal to or slightly less than the full lead of the threads 16. In the drawing I have shown six like or identical parts 23, it being understood that there may be a larger or lesser number of parts if desired. The lower ends of the parts 23 are flat and preferably occupy a common transverse plane normal to the longitudinal axis of the safety joint. The front and rear sides of the parts 23 are sloped or pitched so that their engagement with the clutch parts of the section B resists chattering of the member D and disengagement of the torque transmitting means E when the safety joint is subjected to heavy and varying torsional forces. The front and rear surfaces of the parts 23 may be substantially radial relative to the longitudinal axis of the joint, as shown in Fig. 6, and are pitched downwardly and forwardly relative to the right hand direction of rotation. The rear faces or sides of the parts 23 may have a greater pitch or slope than the forward sides of the parts. The teeth or parts 23 are spaced and formed so that the notches 25 between them are equal in size and are of the same size as the parts, that is, the mouths of the notches 25 are of about the same width as the bases of the parts 23 and the inner parts of the notches are of about the same width as the lower ends of the parts 23.

The special or wider part 24 may be termed the "control lug," as it governs the meshing engagement of the parts 23 with the lug parts 26 of the section B when the joint is made up. The control lug 24 is of the same shape as the parts 23, having front and rear sides which slope in the same direction and at the same inclinations as the corresponding sides of the parts 23. Further, the control lug 24 is formed and positioned so that the spaces or notches 25 at its front and rear sides are the same in size and shape as the other notches 25. The lower end of the lug 24 is flat and lies in the same plane as the ends of the parts 23. The lug 24 is characterized by its size or circumferential extent, being considerably wider than the parts 23 and wider than the notches in the section B which receive said parts.

The torque receiving or transmitting parts 26 on the upper end of the section B are complementary to the parts 23 of the member D and are adapted to extend into the notches 25. The lugs or parts 26 are of substantially the same height or axial extent as the parts 23 and have flat upper ends lying in a common transverse plane normal to the long axis of the safety joint. The forward faces of the parts 26 have the same pitch as the rear faces of the parts 23 and the rear sides of the parts 26 have the same pitch as the front sides of the parts 23. The lug parts 26 of the section B are spaced so that the notches 27 between them accurately receive the parts 23 of the member D. As illustrated in Figs. 4, 5 and 6 of the drawing the parts 23 and 26 may be formed and related to fully and accurately mesh. The parts 26 are of the same height or vertical extent as the parts 23 having a height equal to or slightly less than a full lead of the threads 16.

The teeth or lug parts 26 of the member D are formed and related to constitute a continuous row or series with a special or wide notch 28 between the forward and rear ends of the row. This wider notch 28 is provided to receive the control lug 24. The notch 28 is complementary to the control lug 24 and is formed to accurately receive the lug as shown in Fig. 4 of the drawing. The torque transmitting parts 23 and 26 and the lug 24 may be of the full width or wall thickness of the member D and the section B and, as illustrated, the spline grooves 19 terminate before reaching the clutch parts so that they do not weaken the same.

The means F serves to urge the member D axially or downwardly to hold the means E engaged for the transmission of torque and is yieldable to allow the member D to back up when the means E is being engaged and released, as will be later described. The means F is in the nature of a spring acting downwardly against the member D. As illustrated in the drawing the means F is a helical spring surrounding the section A and arranged under compression between the lower end of the member 10 and the upper end of the member D. The spring or means F is of substantial strength to resist vibration and chattering of the member D and to maintain the means E firmly engaged. The spring or means F is initially or normally under suitable compression.

In operation the safety joint is made up or assembled at the ground surface. In assembling the tool the stem 12 is introduced into the socket 14 and the section A is turned in the right hand direction relative to the section B to thread the connection C together. As the section A is threaded into the section B the member D moves or feeds downwardly toward the upper end of the section B. When the member D reaches the upper end of the section B the lower ends of the parts 23 and the lower end of the control lug 24 contact the upper ends of the parts 26. This does not occur until the threads 16 are almost fully made up or engaged. The parts are related so that the forward end portion of the lug 24 engages the top of that part 26 which is at the forward end of the notch 28. The extent of this engagement of the lug 24 with the said part 26 is preferably quite short and is the initial engagement of the control lug 24 with the section B. Fig. 3 illustrates the extent of the initial engagement of the lug 24 with the section B and shows that this engagement may be quite short.

The rotation or turning of the section A to the right is continued following the initial engagement of the parts as just described. During this continued turning of the section A the lower ends of the parts 23 and the lower end of the lug 24 ride on the upper ends of the parts 26 of the section B. The control lug 24, having a width greater than the notches 27, is unable to enter the notches 27 and the wide lug 24 riding along the tops of the parts 26 prevents the parts 23 from meshing with the parts 26. The width or circumferential extent of the control lug 24 is such that the lug either has contact with the entire top of a part 26 or has partial contact with the tops of two adjacent parts 26 during the continued rotation, the wide lug bridging the notches 27 as the turning continues so that the member D is positively held against downward movement relative to the section B. The co-operating threads 16 cause the section A to move downwardly relative to the section B as the right hand rotation of the section A is continued and additional energy is stored in the spring F by the action of the member 10 moving downwardly relative to the member D. At the end of almost one complete revolution of the section A in a right hand direction, following the initial engagement of the member D with the section B, the control lug 24 reaches the wide notch 28, that is, it comes to a position at the mouth of the wide notch 28 so that the compressed spring or means F suddenly moves the member D downwardly on the section A to engage the parts 23 and lug 24 between the spaced parts 26 of the section B. This, of course, limits further right hand rotation of the section A relative to the section B but the sloping ends of the parts 23 and lug 24 camming against the sloping ends of the parts 26 as the means E is engaged may produce or allow a slight forward turning of the section A and member D with respect to the section B. It is to be observed that the extent of axial engagement of the parts 23 and lug 24 with the parts 26 almost equals the lead of the threads 16 because the section A has turned one complete revolution with respect to the section B minus the circumferential extent of the short initial engagement of the lug 24 with the face part 26 as shown in Fig. 3. This distinguishes the present structure over prior devices of this class wherein the extent of cooperation of the torque transmitting parts has only been approximately one-half the lead of the threads. Further, it is to be observed that the parts 23 and lug 24 cooperate with the parts 26 at a plurality, say seven points spaced throughout the circumference of the tool for the adequate and distributed transmission of the torque. This further distinguishes the present tool over prior devices having only two diametrically opposite sets of two torque transmitting faces.

When the tool has been assembled as above described, it is connected in the drilling string which in turn is made up and lowered into the well in the usual manner. During the use or operation of the well string the safety joint is operable to positively transmit tensional strains, compression strains and right hand torque. The axial or compression and tensional forces are taken or transmitted by the threads 16 which are sufficiently heavy to handle very heavy forces. The right hand rotation or torque is transmitted from the section A to the member D through the splines 18 and is transmitted from the member D to the section B by the means E. The parts 23 and the control lug 24 have full engagement with the spaced parts 26 for the transmission of very heavy torsional forces from the member D to the section B. As pointed out above, the parts 23 and the lug 24 have extensive engagement with the parts 26 at a multiplicity of points spaced throughout the circumference of the joint and the aggregate area of this engagement is more than sufficient for the dependable transmission of the right hand torque. The multiple and extensive torque transmitting surfaces of the means E effectively withstand the hammering and vibration to which they may be subjected during rotary drilling operations and by reason of their number and extent are worn and battered to a minimum extent by such action. This makes the tool long wearing. The under cut or sloping forward faces of the parts 23 and lug 24 engaging with the rear faces of the parts 26 serve to resist upward movement of the member D on the section A, thus aiding the spring or means F in this action. The lugs or parts of the means E remain in full engagement at all times and until the joint is intentionally disconnected. As all right hand torque is transmitted through the member D and the means E the threads 16 are relieved of the torque and are not tightened. This leaves the threads free so that they may be readily unthreaded.

If it becomes desirable or necessary to disconnect the safety joint when the equipment is in the well the drilling string or well string is turned to the left to turn the section A relative to the section B. When the left hand torque on the section A builds up to a given value the sloping rear surfaces of the parts 23 and lug 24 ride up the sloping forward faces of the parts 26 to shift the member D upwardly on the section A. This cam action raises the member D until it is free to turn with the section A relative to the section B at which time the lower ends of the parts 23 and lug 24 ride on the upper ends of the parts 26. The parts 23 and the lug 24 ride along the tops of the parts 26 for almost one complete revolution. During this initial turning of the section A relative to the section B in the left hand direction the broad lug 24 successively bridges the spaced notches 27 to prevent reengagement of the parts 23 with the parts 26. When the action A has been turned almost one complete revolution with respect to the section B the short spline 18ª comes against the lower end of the stop block 20 and as the threads 16 continue to feed the section A upwardly with respect to the section B the spline 18ª engaged with the stop block lifts the member D with the section A. Thus, the member D is raised clear of the section B. The left hand rotation is continued to completely disengage the threads 16, which frees the section A from the section B so that the portion of the string extending upwardly from the section A may be withdrawn from the well.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A safety joint comprising two sections, a releasable threaded connection for holding the sections against relative longitudinal movement in both directions, a member connected with one section for translation, series of spaced parts on the other section, series of spaced parts on the member for cooperating with the first named series of parts for the transmission of torque and to prevent tightening of the threaded connection, one of said series having a space between two of its adjacent parts which is wider than the spaces between its other parts, the other of said series including a part wider than its other parts adapted to enter said wider space but unable to enter the other spaces, and means for yielding urging the member in a direction to cause said series to mesh when the said connection is threaded together, said wider part preventing meshing of said series, when the series are in contact during threading together of said connection, until it enters said wider space upon the completion of a given amount of relative turning between the sections.

2. A safety joint comprising two sections, a releasable threaded connection for holding the sections against relative longitudinal movement in both directions, a member connected with one section for translation, series of clutch parts on the member and other section cooperable to limit threading together of said connection and adapted to transmit torque in the thread-tightening direction, the clutch parts on both the member and said other section being truncated in planes normal to the longitudinal axis of the threaded connection and the axial extent of engagement of said parts being greater than one-half the lead of the threads of said connection, and yieldable means for holding the member in the position where the clutch parts are in engagement.

3. A safety joint comprising two sections, a releasable threaded connection for holding the sections against relative longitudinal movement in both directions, a member connected with one section for translation, series of clutch parts on the member and other section cooperable to limit threading together of said connection and adapted to transmit torque in the thread-tightening direction, the extremities of the clutch parts of the member and said other section lying in planes normal to the longitudinal axis of the threaded connection and the front and rear sides of said parts being cooperable and being pitched to resist true axial movement of the member relative to said other section in a direction required for the disengagement of said parts, the extent of the clutch parts in a direction axial of the joint being greater than one half of the lead of the threads of said connection, and yieldable means for resisting said true axial movement of the member.

4. A safety joint comprising a mandrel section, a socket section for receiving the mandrel section, releasable threads for connecting the sections for the transmission of axial forces, a member carried by the mandrel for translation thereon, and having an end opposing an end of the socket section, annular series of spaced drive parts on said opposing ends cooperable for the transmission of torque in the thread-tightening direction and to limit tightening of the threads when the joint is made up, the extent of axial engagement of said parts being almost as great as the lead of the threads, and spring means urging the member toward the socket section to resist disengagement of said parts, one of said series including a part wider than its other parts, the other series having two adjacent parts spaced apart a sufficient distance to receive said wider part after the tips of the series have engaged for almost a complete relative revolution of the sections during threading together of the sections.

5. A safety joint comprising a mandrel section, a socket section for receiving the mandrel section, releasable threads for connecting the sections for the transmission of axial forces, a member carried by the mandrel for translation thereon, and having an end opposing an end of the socket section, annular series of spaced drive parts on said opposing ends cooperable for the transmission of torque in the thread-tightening direction and to limit tightening of the threads when the joint is made up, the parts having cooperating faces having an axial length almost as great as the lead of the threads and pitched to lock the member against movement when transmitting thread-tightening torque, and spring means urging the member toward the socket section to resist disengagement of said parts, one of said series including a part wider than its other parts, the other series having two adjacent parts spaced apart a sufficient distance to receive said wider part after the tips of the series have engaged for almost a complete relative revolution of the sections during threading together of the sections.

GLENN D. JOHNSON.